United States Patent [19]

Ovard et al.

[11] Patent Number: 5,666,379
[45] Date of Patent: Sep. 9, 1997

[54] BEST-OF-M PULSE POSITION MODULATION DETECTOR

[75] Inventors: David Ovard, Meridian, Id.; Ryan N. Jensen, Colorado Springs, Colo.

[73] Assignee: Omnipoint Corporation, Colorado Springs, Colo.

[21] Appl. No.: 468,802

[22] Filed: Jun. 6, 1995

Related U.S. Application Data

[63] Continuation-in-part of Ser. No. 146,490, Nov. 1, 1993, abandoned.

[51] Int. Cl.$^6$ .................................................. H03K 7/04
[52] U.S. Cl. ........................................ 375/239; 370/813
[58] Field of Search ................................. 375/239, 200, 375/204, 206, 340; 327/22, 23, 26, 27; 329/313; 332/112; 370/10, 8, 213

[56] References Cited

U.S. PATENT DOCUMENTS

| | | | |
|---|---|---|---|
| Re. 27,738 | 8/1973 | Honma et al. | 332/9 R |
| 3,934,203 | 1/1976 | Schiff | 325/65 |
| 4,164,628 | 8/1979 | Ward et al. | 179/15 BA |
| 4,189,677 | 2/1980 | Cooper et al. | 325/321 |
| 4,355,399 | 10/1982 | Timor | 375/1 |
| 4,418,393 | 11/1983 | Zachiele, Jr. | 364/724 |
| 4,506,372 | 3/1985 | Massey | 375/116 |
| 4,550,414 | 10/1985 | Guinon et al. | 375/1 |
| 4,561,089 | 12/1985 | Rouse et al. | 370/18 |
| 4,563,774 | 1/1986 | Gloge et al. | 455/607 |
| 4,587,662 | 5/1986 | Langwellpott | 375/1 |
| 4,641,317 | 2/1987 | Fullerton | 375/1 |
| 4,688,210 | 8/1987 | Eizenhofer | 370/18 |
| 4,774,715 | 9/1988 | Messenger | 375/1 |
| 4,807,222 | 2/1989 | Amitay | 370/85 |
| 4,813,057 | 3/1989 | Fullerton | 375/37 |
| 4,918,689 | 4/1990 | Hui | 370/85.9 |
| 4,979,170 | 12/1990 | Gilhousen et al. | 370/104.1 |
| 4,979,186 | 12/1990 | Fullerton | 375/23 |
| 5,029,184 | 7/1991 | Andren | 375/1 |
| 5,038,406 | 8/1991 | Titterton | 359/113 |
| 5,132,986 | 7/1992 | Endo et al. | 375/1 |
| 5,151,698 | 9/1992 | Pophillat | 375/239 |
| 5,157,686 | 10/1992 | Omura et al. | 375/1 |
| 5,166,952 | 11/1992 | Omura et al. | 375/1 |
| 5,206,909 | 4/1993 | Gates | 380/59 |
| 5,253,268 | 10/1993 | Omura et al. | 375/1 |
| 5,299,227 | 3/1994 | Rose | 375/1 |
| 5,313,457 | 5/1994 | Hostetter et al. | 370/18 |
| 5,353,303 | 10/1994 | Walthall | 37/1 |
| 5,392,287 | 2/1995 | Tiedemann, Jr. et al. | 370/95.1 |
| 5,469,469 | 11/1995 | Haires | 375/201 |
| 5,471,509 | 11/1995 | Wood et al. | 375/350 |

FOREIGN PATENT DOCUMENTS

| | | | |
|---|---|---|---|
| WO93/18596 | 9/1993 | WIPO | H04J 3/16 |
| 9512943 | 5/1995 | WIPO | H04L 25/02 |

OTHER PUBLICATIONS

Unikauf, Manfred G., Surface Wave Devices in Spread Spectrum Systems, Surface Wave Filters (Wiley 1977), pp. 477–509.

Dixon, R., *Spread Spectrum Systems with Commercial Applications* (J. Wiley & Sons, 3d ed. 1994).

Dixon, Robert C., *Spread Spectrum Systems*, (J. Wiley & Sons, 2d ed. 1984).

*Primary Examiner*—Wellington Chin
*Assistant Examiner*—Congvan Tran
*Attorney, Agent, or Firm*—Lyon & Lyon LLP

[57] ABSTRACT

A pulse position modulation detector divides a timing window into a plurality of pulse position windows, determines the peak magnitude of a signal level received during each pulse position window, compares the peak magnitudes of the signal detected during each pulse position window to determine during which pulse position window the greatest peak magnitude is detected, and generates a bit sequence corresponding to the pulse position window wherein the greatest peak magnitude was detected within the current timing window.

18 Claims, 6 Drawing Sheets

BEST-OF-M PULSE POSITION MODULATION DETECTOR

This application is a continuation-in-part of U.S. patent application Ser. No. 08/146,490, now abandoned, filed Nov. 1, 1993 in the names of Jeffrey S. Vanderpool, Ryan N. Jensen, Pete O. Petersen and Michael Williams, entitled "Pulse Position Modulation With Spread Spectrum," which is incorporated by reference as if fully set forth herein.

BACKGROUND OF THE INVENTION

1) Field of the Invention

The field of this invention pertains to communications and, more particularly, to a method and apparatus for processing and detecting pulse position modulated signals.

2) Background of the Related Art

In a communication system, an information signal may be modulated onto one or more carrier signals for transmission over a communication channel. Conveniently, the amplitude, frequency, and/or time characteristics of the carrier signal or signals may be modulated by the information signal to be communicated.

One technique for modulating and transmitting digital signals is known as pulse position modulation (PPM). In a PPM communication system, a series of pulses is generated and transmitted over a communication channel. A time interval is divided into equal-length segments known as timing windows. Pulses are transmitted at an average pulse transmission rate, R, which is selected based upon the bandwidth available over the communication channel. In an exemplary PPM communication system known in the art, a single pulse is produced during each timing window. The duration of the timing window is calculated to be:

$$T_{timing\ window} = 1/R$$

Typically, the pulse width or duration is much smaller than the timing window, i.e., $T_{pulse} \ll T_{timing\ window}$.

An information signal modulates the time position of the single pulse within each timing window. According to one technique, the time position of a pulse within a timing window is varied according to the amplitude of the information signal to be communicated.

In a digital communication system, the information to be transmitted generally comprises a digital bit-stream. The digital bit-stream comprises a series of bits, each bit having one of two possible amplitude levels, typically denoted as "1" and "0." Thus, in a digital communication system incorporating PPM modulation, a bit may be transmitted in each timing window, with a pulse being produced at one of two discrete time positions within each timing window, depending upon whether the bit to be transmitted corresponds to a "1" or a "0."

In many digital systems, spread spectrum communication techniques are advantageously employed for reduced transmission power requirements, efficient spectrum utilization, and improved security, including a reduced probability of detection and interception and an enhanced immunity to interference and jamming. An extensive discussion of spread spectrum communication, spreading codes, and chip sequences, may be found, e.g., in R. Dixon, SPREAD SPECTRUM SYSTEMS (J. Wiley & Sons, 2d ed. 1984).

Although PPM is a useful communication technique, one potential drawback is that because the system relies on relatively precise timing and detection of a single pulse in each timing window, it is susceptible to noise or interference which either causes false data peaks to register incorrect pulse detection in the receiver, or suppresses the actual pulse transmitted and causes a loss of information. Accordingly, it would be advantageous to provide an improved technique for processing and detecting pulse position modulated signals. It further would be advantageous to provide such a technique well adapted to the reception and detection of spread spectrum signals.

SUMMARY OF THE INVENTION

The present invention comprises a system and method for processing and detection of pulse position modulated (PPM) digital signals.

In one aspect of the invention, a Best-of-M pulse position modulation detector in a receiver divides a timeline into a series of timing windows. The Best-of-M PPM detector applies a received signal to the timing window pattern, and detects the time position within each timing window where a pulse is received.

In another aspect of the invention, a Best-of-M pulse position modulation detector divides each timing window into a plurality of smaller pulse position windows. Each pulse position window is assigned a unique corresponding bit sequence such that, if a pulse is detected within a particular pulse position window, the detector will generate the corresponding bit sequence as an output signal.

In another aspect of the invention, a Best-of-M pulse position modulation detector incorporates a peak detector prior to analog-to-digital conversion. The peak detector assists in sampling narrow pulses with an analog-to-digital converter (ADC) by holding the peak signal level until the end of the timing window.

In another aspect of the invention, a Best-of-M pulse position modulation detector receives a signal, detects the peak signal level for each pulse position window, and compares the peak signal level for each pulse position window against the peak signal level detected within the previous pulse position windows to determine which peak signal level is greater. Thus at the end of the timing window, the Best-of-M pulse position modulation detector determines which pulse position window produced the largest peak signal level and generates a bit sequence corresponding to the PPM signal which was transmitted during that timing window.

In another aspect of the invention, a communication system utilizing spread spectrum techniques and pulse position modulation incorporates a Best-of-M pulse position modulation detector, wherein the position of a spread spectrum signal in a timing window conveys one or more bits of information.

DESCRIPTION OF THE PREFERRED EMBODIMENT

Figure 1:
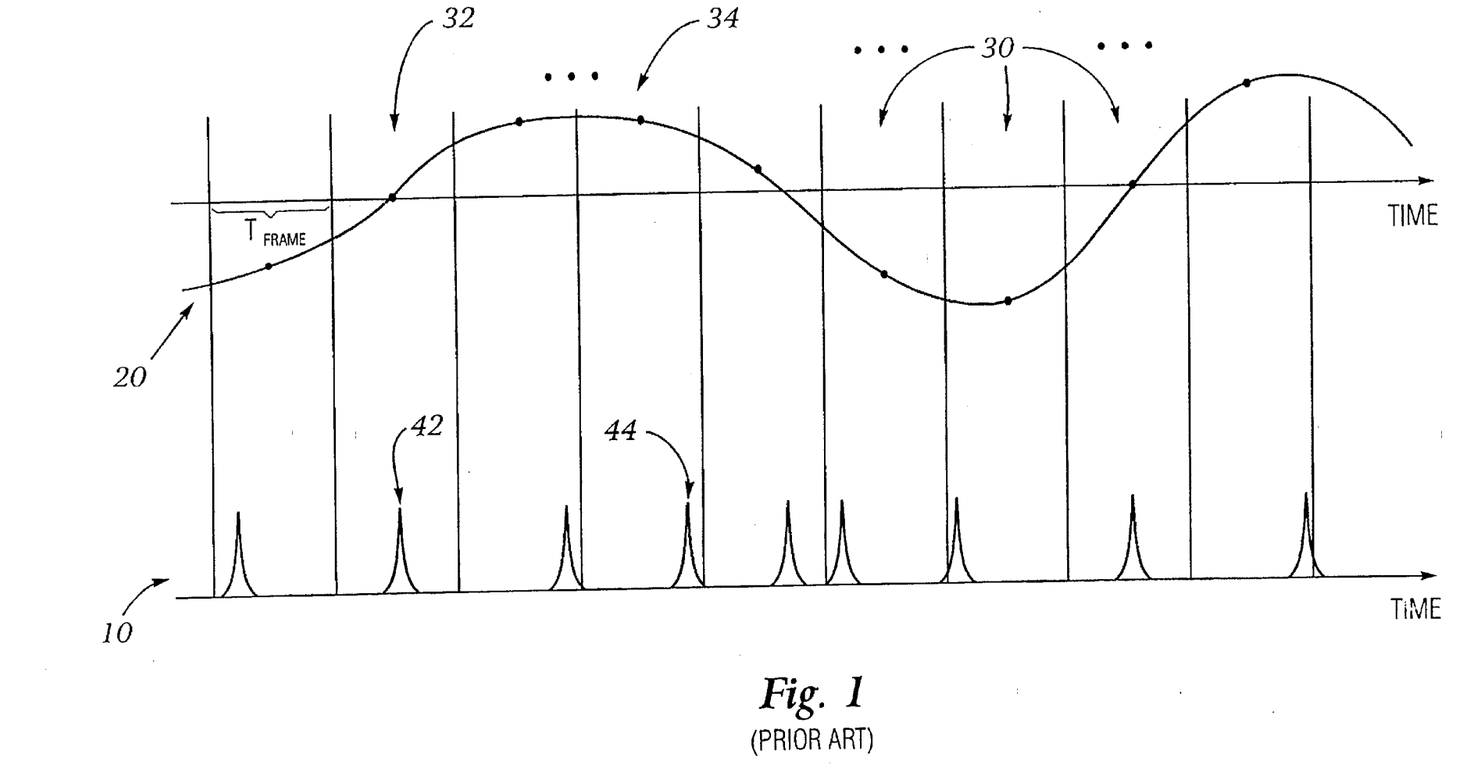
FIG. 1 is a waveform diagram of an exemplary information signal and a corresponding pulse position modulated signal.

FIG. 1 illustrates a prior art pulse position modulated (PPM) signal 10 which is produced from an exemplary information signal 20. The information signal 20 and the PPM signal 10 each are divided into a plurality of timing windows 30 of duration $T_{timing\ window}$. The information signal 20 is sampled once during the center of each timing window 30 to produce a sampled amplitude. Thus the PPM signal produces pulses at an average pulse transmission rate R, such that $R=1/T_{timing\ window}$.

Where the sampled amplitude of information signal 20 is zero, a pulse is produced at the center of the corresponding timing window in the PPM signal 10. Thus, e.g., as shown in FIG. 1, an $i^{th}$ pulse 42 is produced during timing window 32, at time $t_i=(i-1)*T_{interval}+T_{interval}/2$, where T interval is a period selected to be at least twice the highest frequency contained in the information signal 20.

Where the sampled amplitude of information signal 20 is greater than zero, a pulse is produced during the latter half of the corresponding timing window in the PPM signal 10. The pulse is produced at a time position which is offset from the center of the timing window by an amount which is proportional to the amplitude of the information signal. Thus, as shown in FIG. 1, during timing window 34, when the sampled amplitude of information signal 20 is greater than zero, then a pulse 44 is produced at a time position during the last half of the timing window.

Figure 2:
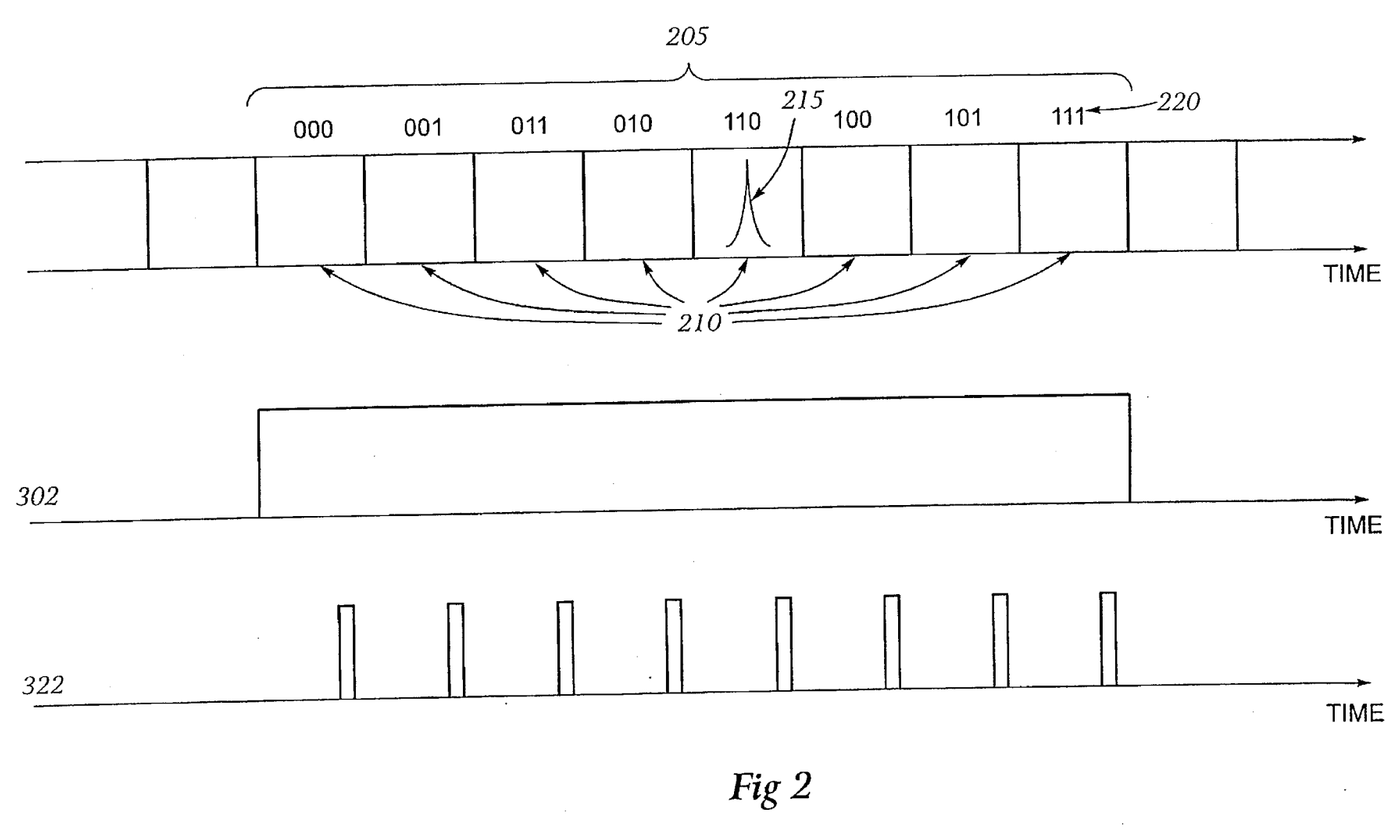
FIG. 2 is a timing diagram of signals associated with a pulse position modulation detector.

FIG. 2 shows how a timing window 205 may be divided into a plurality of smaller pulse position windows 210 for transmitting and receiving a PPM signal so as to convey multiple bits of information with each pulse. The transmitter selects a pulse position window 210 during which a correlation pulse 215 is to be transmitted based upon an information signal to be communicated.

In a preferred embodiment, the information signal to be communicated comprises a binary digital bit-stream, and the number of pulse position windows 210 which are used is selected based upon a number of digital bits to be communicated during each timing window. Each pulse position window is preferably matched to a unique corresponding bit sequence.

In the exemplary embodiment shown in FIG. 2, a timing window 205 is divided into eight pulse position windows 210 for communicating three binary bits per pulse. Each of eight possible bit sequences 220 corresponds to a transmitted pulse in a unique pulse position window 210. In general, if it is desired to transmit n bits per pulse through pulse position modulation, then the timing window 205 is divided into M pulse position windows 210 where $M=2^n$.

In a preferred embodiment, the bit sequences 220 are assigned to the pulse position windows 210 through a Gray code such that pulse position windows which are adjacent in time are matched to bit sequences which have only one bit differing between them. An exemplary Gray code arrangement for bit sequences 220 having three bits (eight pulse position windows) is shown in FIG. 2.

Embodiments and other aspects of the invention described herein, including the system embodiments described below, may be made or used in conjunction with inventions described, in whole or in part, in U.S. patent application Ser. No. 08/304,091 filed Sep. 9, 1994 in the name of Randy Durrant and Mark Burbach entitled "Coherent and Noncoherent CPM Correlation Method and Apparatus," which is hereby incorporated by reference as if fully set forth herein. In particular, the '091 application sets out, among other things, a preferred communication system protocol, and environment for spread spectrum communication.

Figure 3:
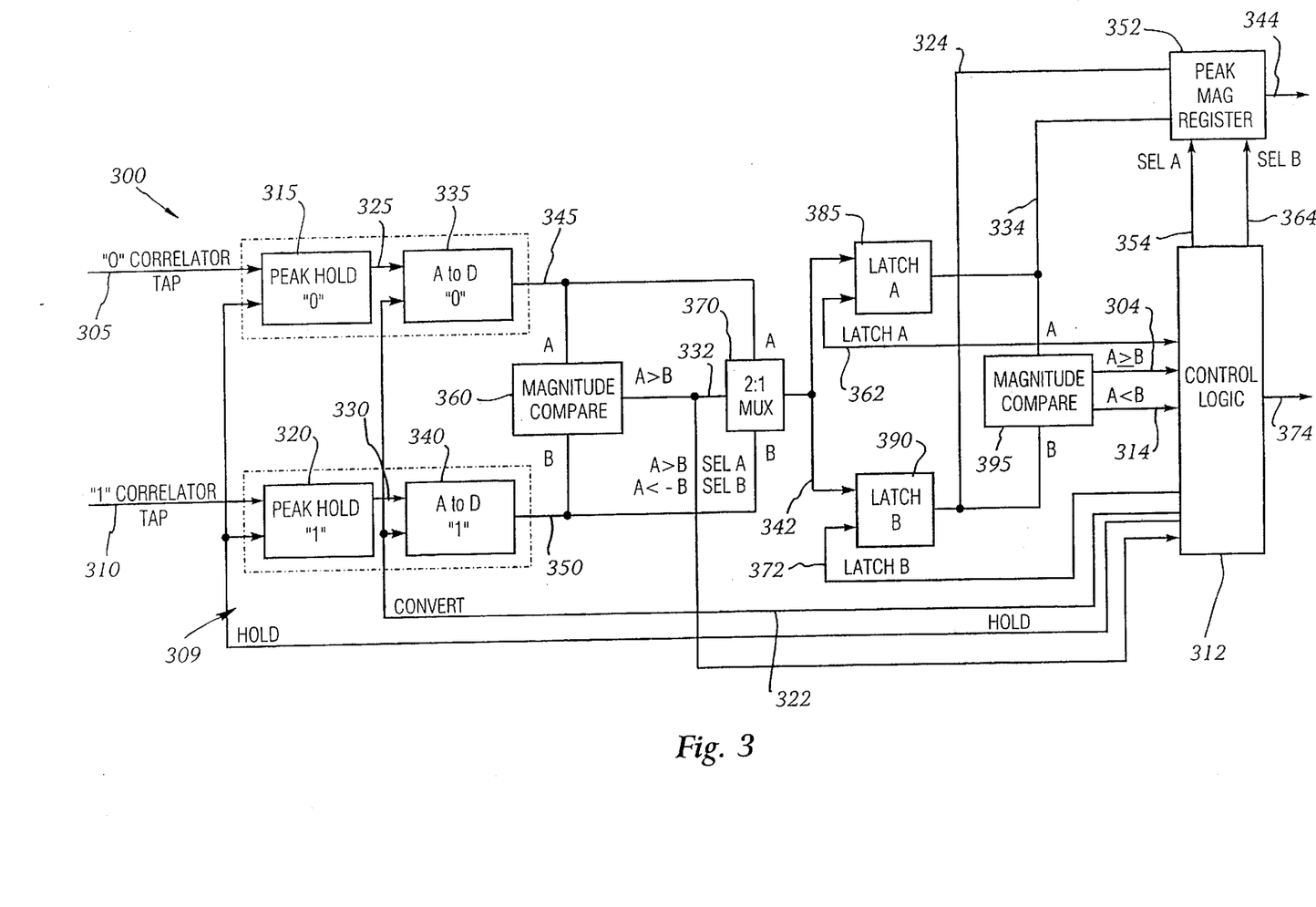
FIG. 3 is a block diagram of a first preferred embodiment of a pulse position modulation detector according to one or more aspects of the present invention.

A first preferred embodiment of a Best-of-M pulse position modulation detector is shown in FIG. 3. As shown in FIG. 3, a first correlator tap signal 305 is provided as an input to a first peak detector 315 in a Best-of-M pulse position modulation detector 300. The first peak detector 315 receives the first correlator tap signal 305 and generates a first peak signal 325. Likewise, a second correlator tap signal 310 is provided as an input to a second peak detector 320. The second peak detector 320 receives the second correlator tap signal 310 and generates a second peak signal 330.

The first and second correlator tap signals 305 and 310 may be provided from correlators each matched to the detection of a specific two bit pattern. For example, the correlator tap signals 305 and 310 may each be output from a separate frequency shift keyed (FSK) detector or, in a preferred embodiment, from a separate chip detection correlator in a spread spectrum communication system. In this manner, pulse position modulation is combined with another coding technique so as to increase the number of bits transmitted during a timing window 205, thereby increasing the overall data throughput of the communication system.

In a preferred embodiment, the first and second correlator tap signals 305 and 310 may be generated by a reciprocal mode surface acoustic wave (SAW) correlator such as is disclosed in U.S. Pat. No. 5,081,642, entitled "Reciprocal Mode SAW Correlator Method and Apparatus," which is hereby incorporated by reference as if fully set forth herein.

In a preferred embodiment, a hold signal 302 (see FIG. 2) is generated by a control logic circuit 312. The first and second peak detectors 315 and 320 are enabled during each timing window 205 by the hold signal 302, as shown in FIG. 2. While the hold signal 302 is asserted, the first peak signal 325 follows the highest peak produced by the first correlator tap signal 305 during the timing window 205. Likewise, while the hold signal 302 is asserted, the second peak signal 330 follows the highest peak produced by the second correlator tap signal 310 during the timing window 205. At the end of each timing window 205, the hold signal 302 is negated and the levels of the first and second peak signals 325 and 330 are reset in preparation for the following timing window 205.

Figure 4:
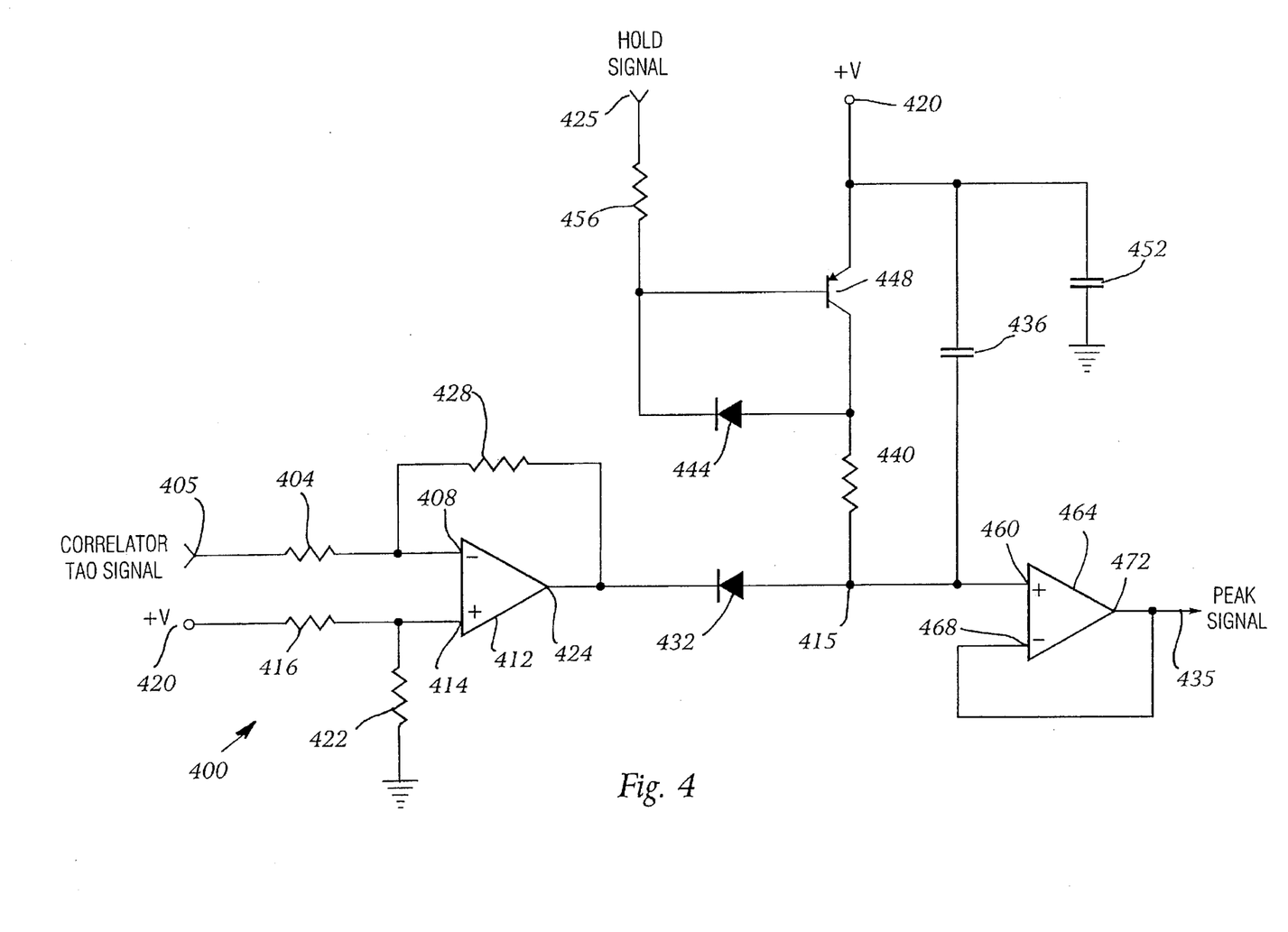
FIG. 4 is a preferred embodiment of a peak-hold circuit according to one or more aspects of the present invention.

In a preferred embodiment, peak detectors 315 and 320 each may be embodied as a peak-hold circuit 400 such as shown in FIG. 4.

As shown in FIG. 4, peak-hold circuit 400 receives a correlator tap signal 405 from a correlator, as previously explained herein. The correlator tap signal 405 is coupled through resistor 404 to an inverting input 408 of a first buffer amp 412. The buffer amp 412 also has a noninverting input 414 which is coupled to the output of a voltage divider consisting of resistors 416 and 422. Resistor 416 is connected to a voltage supply 420, and resistor 422 is connected to ground, as shown in FIG. 4.

The first buffer amp 412 has an output 424 which is coupled back to the inverting input 408 through resistor 428.

The output 424 also is provided to the cathode of a first diode 432. The anode of diode 432 is connected to a hold capacitor 436, and also to a discharge resistor 440. The hold capacitor 436 is connected to the voltage supply 420 by which it is charged to produce a peak-hold signal 415, as explained in more detail below.

Discharge resistor 440 is connected to the anode of a second diode 444 and to the collector of a transistor 448. The emitter of transistor 448 is connected to voltage supply 420, which is also connected to bypass capacitor 452. Diode 444 has a cathode connected to a base of transistor 448 and through resistor 456 to a hold signal 425. So long as the hold signal 425 is asserted, the peak-hold signal 415 tracks the peak voltage of correlator tap signal 405. When the hold signal 425 is negated, the peak-hold signal 415 is discharged.

The peak-hold signal 415 is provided to a noninverting input 460 of a second buffer amp 464. The buffer amp 464 also has an inverting input 468 and an output 472 which are connected together in a feedback configuration. The output 472 of the buffer amp 464 is a peak signal 435.

The peak signal 325 corresponds to the peak signal 435 in FIG. 4, and is coupled to an analog-to-digital converter (ADC) 335. The control logic circuit 312 provides a convert signal 322 to the analog-to-digital converter 335 which is asserted at the end of each pulse position window 210. In response to the convert signal 322, the analog-to-digital converter 335 converts the peak signal 325 to a first digitized peak signal 345.

Likewise, the peak signal 330 also corresponds to the peak signal 435 of FIG. 4 and is coupled to a second analog-to-digital converter 340. In response to the convert signal 322, the analog-to-digital converter 340 converts the peak signal 330 to a second digitized peak signal 350.

Digitized peak signals 345 and 350 are both coupled to a comparator 360 and to a multiplexer 370. The comparator 360 provides a select signal 332 to the multiplexer 370 in response to digitized peak signals 345 and 350. In response to digitized peak signal 345 exceeding digitized peak signal 350, select signal 332 causes multiplexer 370 to select digitized peak signal 345 as a sample peak magnitude signal 342. Conversely, when digitized peak signal 350 is greater than or equal to digitized peak signal 345, then select signal 332 causes multiplexer 370 to select digitized peak signal 350. Thus select signal 332 indicates which correlator tap signal 305 or 310 has produced the larger peak signal during the timing window 205.

In response to select signal 332, the multiplexer 370 provides the sample peak magnitude signal 342 to an A-Latch 385 and to a B-Latch 390. Control logic circuit 312 provides a Latch_A enable signal 362 to latch an A-latch output signal 334 generated by A-latch 385. Control logic circuit 312 also provides a Latch_B enable signal 372 to latch a B-latch output signal 324 generated by B-latch 390.

During the first pulse position window 210 in each timing window 205, the A-latch 385 is transparent and the A-latch output signal 334 tracks the sample peak magnitude signal 342, while the B-latch output signal 324 is reset. At the end of the first pulse position window 210, the control logic circuit 312 latches the A-latch 385 with the sample peak magnitude, which then becomes a current peak magnitude for the subsequent pulse position window. Likewise, the A-latch output signal 334 becomes a current peak magnitude signal. The control logic circuit 312 also activates a Select_A signal 354 to store the A-latch output signal 334 (i.e., the current peak magnitude) into a peak magnitude register 352. At the same time, control logic circuit 312 internally stores select signal 332 indicating which correlator tap signal 305 or 310 produced the sample peak magnitude signal 342, and also stores the bit sequence 220 in an internal register (not shown) corresponding to the first pulse position window in an internal register. Also, the control logic circuit makes the B-latch 390 "transparent" such that the B-latch output signal 324 follows the sample peak magnitude signal 342.

At the end of the second pulse position window 210 in each timing window, comparator 395 compares the A-latch output signal 334 (the current peak magnitude signal) with the B-latch output signal 324, (the sample peak magnitude signal 342). Comparator 395 generates an A≧B signal 304 and an A<B signal 314.

If the A-latch output signal 334 (the current peak magnitude) is less than the B-latch output signal 324 (the sample peak magnitude), then the A<B signal 314 is asserted and the control logic circuit 312 latches the B-latch 390 with the sample peak magnitude to serve as a new current peak magnitude for the immediately following pulse position window. The B-latch output signal 324 comprises the current peak magnitude signal for the immediately following pulse position window. At the same time, the control logic circuit 312 makes the A-latch 385 transparent and the A-latch output signal 334 follows the sample peak magnitude signal 342 during the immediately following pulse position window 210. The control logic circuit 312 also stores the sample peak magnitude in the peak magnitude register 352 and updates its internal register with the bit sequence 220 corresponding to the pulse position window (i.e, the second pulse position window) which produced the new current peak magnitude. The select signal 332 also is stored in the control logic circuit 312, indicating which correlator tap signal 305 or 310 produced the new current peak magnitude.

On the other hand, if the contents of the A-latch 385 (contents of the peak magnitude register 352) are greater than or equal to the magnitude of the sample peak magnitude signal 342, then the A≧B signal 304 is asserted and the A-latch 385 remains latched with the current peak magnitude during the immediately following pulse position window while the B-latch 390 remains transparent and tracks the sample peak magnitude signal 342. Also, the contents of the peak magnitude register 352 and the bit sequence 220 stored internally in the control logic circuit remain unchanged. Thus, the A-latch output signal 334 comprises the current peak magnitude signal for the immediately following pulse position window 210.

The effect of the above operations is that during each subsequent pulse position window 210 until the end of the timing window 205, whichever of latches 385 and 390 contains the current peak magnitude is latched to provide a current peak magnitude signal while the other latch is made transparent so as to follow the sample peak magnitude signal 342. At the end of each pulse position window 210 the current peak magnitude signal and the sample peak magnitude signal are compared and whichever has a greater magnitude is stored in the peak magnitude register 352 and becomes the new current peak magnitude for the immediately following pulse position window. At the same time, the control logic circuit updates its internal register with the bit sequence corresponding to the pulse position window 210 which produced the new current peak magnitude. The control logic circuit 312 also stores the select signal 332 indicating the data bit corresponding to the correlator tap signal 305 or 310 which produced the current peak magnitude.

At the end of the timing window 205, the peak magnitude register 352 contains the greatest peak magnitude detected during the timing window. Also, the control logic circuit contains the bit sequence 220 corresponding to the pulse position window wherein the greatest peak magnitude was detected, and the correlator data bit corresponding to the correlator tap signal which produced the greatest peak magnitude during the timing window 205. In a preferred embodiment, the correlator data bit is a "1" if the correlator tap signal 305 produced the greatest peak magnitude, and the correlator data bit is a "0" if the correlator tap signal 310 produced the greatest peak magnitude.

The control logic circuit 312 outputs the correlator data bit and the bit sequence corresponding to the pulse position window wherein the greatest peak magnitude was detected as a correlator data bit and PPM data output signal 374. The peak magnitude register 352 outputs a greatest peak magnitude signal 344 which may be used in a receiver incorporating the Best-of-M pulse position modulation detector to perform data qualification and error detection. For example, the greatest peak magnitude signal 344 may be used for "soft" error decision-making in a forward error correction scheme. Forward error correction techniques are well known in the art.

Figure 5:
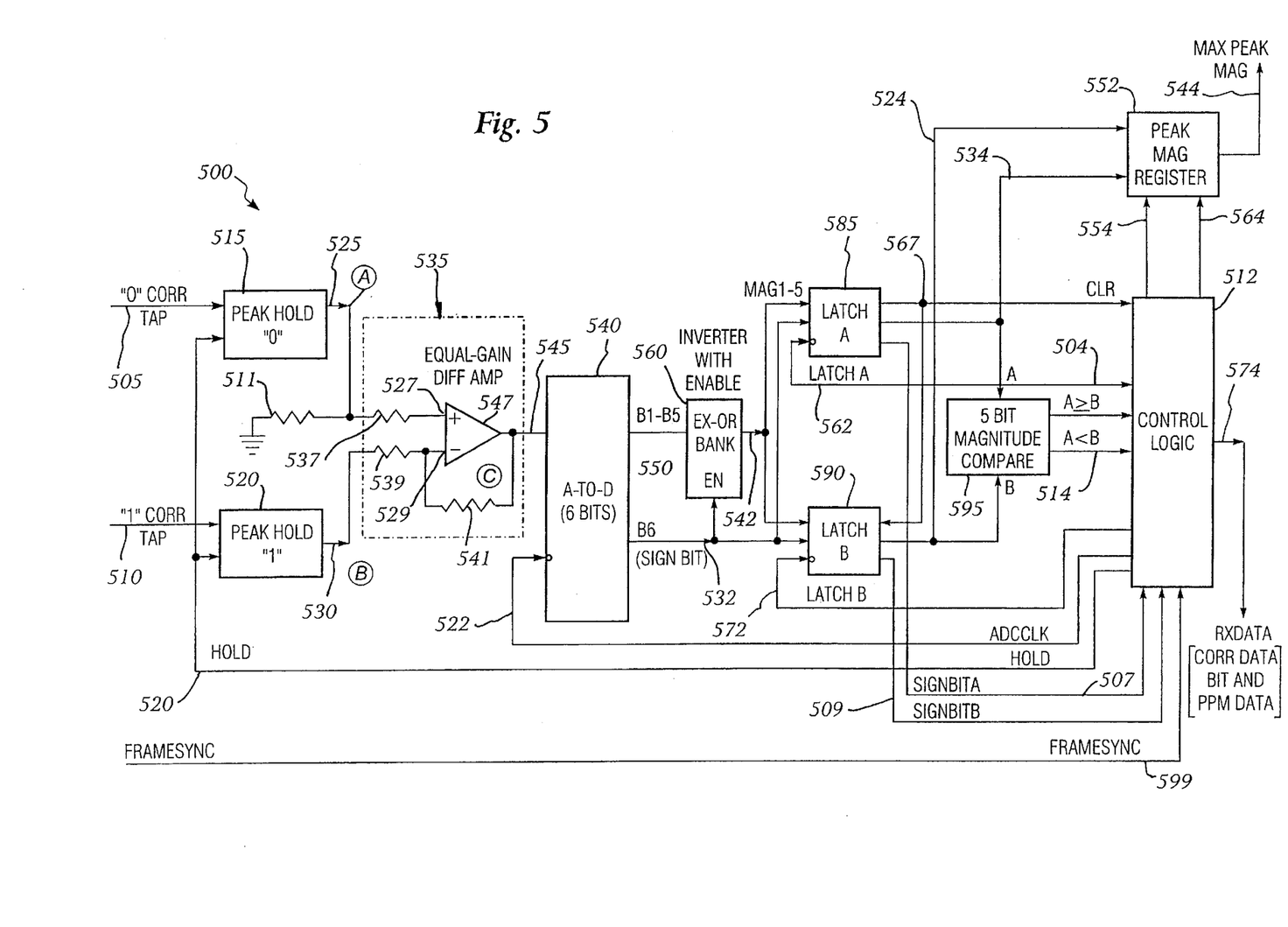
FIG. 5 is a block diagram of a second preferred embodiment of a pulse position modulation detector according to one or more aspects of the present invention.

FIG. 5 shows a second preferred embodiment of a Best-of-M pulse position modulation detector 500. The Best-of-M pulse position modulation detector 500 comprises first and second peak detectors 515 and 520, an Equal-gain Diff-amp 535, an analog-to-digital converter 540, an XOR bank 560, an A-latch 585, a B-latch 590, a magnitude comparator 595, a peak magnitude register 552, and a control logic circuit 512.

As shown in FIG. 5, a first correlator tap signal 505 is provided as an input to the first peak detector 515. The first peak detector 515 generates a first peak signal 525. Likewise, a second correlator tap signal 510 is provided as an input to the second peak detector 520. Peak detector 520 generates a second peak signal 530.

The first and second correlator tap signals 505 and 510 may be provided from correlators matched to the detection of each of two bit values, such as discussed above with respect to the embodiment of FIG. 3.

The first and second peak detectors 515 and 520 are enabled during each timing window 205 by a hold signal 502 provided by the control logic circuit 512. While the hold signal 502 is asserted, the first peak signal 525 has a level which follows the highest peak produced by the first correlator tap signal 505 during the timing window 205, and the second peak signal 530 has a level which follows the highest peak produced by the second correlator tap signal 510 during the timing window 205. At the end of each timing window 205, the hold signal 502 is negated and the levels of the first and second peak signals 525 and 530 are reset in preparation for the following timing window.

In a preferred embodiment, the first and second peak detectors 515 and 520 each may be embodied as the peak-hold circuit 400 as shown in FIG. 4.

The first and second peak signals 525 and 530 are provided to a noninverting input 527 and an inverting input 529, respectively, of the Equal-gain Diff-amp 535. The Equal-gain Diff-amp 535 subtracts the magnitude of the first peak signal 530 from the magnitude of the second peak signal 525 to produce a composite peak signal 545. In response to the first correlator tap signal 505 producing the largest analog peak signal, the composite peak signal 545 has a positive magnitude. However, when the second correlator tap signal 510 produces the largest analog peak signal, then the composite peak signal 545 has a negative magnitude. The composite peak signal 545 is provided to the analog-to-digital converter (ADC) 540.

In a preferred embodiment, the Equal-gain Diff-amp 535 comprises resistors 511, 537, 539, 541, 543 and differential amplifier 547 configured in the manner shown in FIG. 5. However many other suitable variations of differential amplifiers are possible and are understood to be within the spirit and scope of the present invention.

The ADC 540 converts the composite peak signal 545 into a digitized peak signal 550 and a sample correlation data bit signal 532 in response to an ADC clock signal 522 provided by the control logic circuit 512 at the end of each pulse position window 210. The sample correlation data bit signal 532 comprises the most significant bit (MSB) of the ADC 540 output, and indicates which correlator tap signal 505 or 510 has produced the largest peak signal during the current pulse position window 210. The digitized peak signal 550 comprises the remaining M bits of the ADC 540 output, and represents the largest peak magnitude produced by correlator tap signals 505 and 510 during the current pulse position window 210.

In a preferred embodiment, the sample correlation data bit signal 532 has a value of "1" in response to the correlator tap signal 505 producing the largest peak signal level, and a value of "0" in response to the correlator tap signal 510 producing the largest peak signal level.

In a preferred embodiment, the number of pulse position windows M=8, corresponding to an analog-to-digital converter which provides 6 bits of resolution.

The digitized peak signal 550 and the sample correlation data bit signal 532 are provided to the XOR bank 560. If the sample correlation data bit signal 532 indicates that the largest analog peak signal was produced by the second correlator tap signal 510, the XOR bank 560 inverts the values of the M bits in the digitized peak signal 550 to produce a sample peak magnitude signal 542. Otherwise, no inversion is performed and the XOR bank 560 passes the digitized peak signal 550 as the sample peak magnitude signal 542.

The XOR bank 560 provides the sample peak magnitude signal 542 to the A-latch 585 and the B-latch 590. The ADC 540 also provides the sample correlation data bit signal 532 to the A-latch 585 and B-latch 590. Control logic circuit 512 provides a Latch_A enable signal 562 to the A-latch 585 and a Latch_B enable signal 572 to the B-latch 590. Control logic circuit 512 also provides a clear signal 567 to the A-latch 585 and the B-latch 590.

The A-latch 585 generates an A-latch output signal 534 and a Signbit_A signal 507 which indicates which correlator tap signal 505 or 510 produced the composite peak signal 545 whose magnitude is represented by the A-latch output signal 534. The B-latch 590 generates a B-latch output signal 524 and a Signbit_B signal 509 which indicates which correlator tap signal 505 or 510 produced the composite peak signal 545 whose magnitude is represented by the B-latch output signal 524. The A-latch output signal 534 and the B-latch output signal 524 are provided to the comparator 595.

During the first pulse position window 210 in each timing window 205, the A-latch 585 is transparent and the A-latch output signal 534 tracks the sample peak magnitude signal 542, while the B-latch output signal 524 is reset. At the end of the first pulse position window 210, the control logic circuit 312 latches the A-latch 585 with the sample peak magnitude, which then becomes a current peak magnitude for the subsequent pulse position window. Likewise, the A-latch output signal 534 becomes a current peak magnitude signal. The control logic circuit 512 makes the B-latch 590 transparent such that the B-latch output signal 524 follows the sample peak magnitude signal 542. Also, the control logic circuit 312 activates a Select_A signal 354 to store the A-latch output signal 334 (i.e., the current peak magnitude) into a peak magnitude register 352. The control logic circuit 512 internally stores the Signbit_A signal 507 indicating which correlator output signal 505 or 510 produced the sample peak magnitude signal 542 during the first pulse position window, and stores the bit sequence 220 corresponding to the first pulse position window 210 in an internal register (not shown).

At the end of the second pulse position window 210 in each timing window, comparator 595 compares the A-latch output signal 534 (the current peak magnitude signal) with the B-latch output signal 524, (the sample peak magnitude signal 542). Comparator 595 generates an A≧B signal 504 and an A<B signal 514.

If the A-latch output signal 534 (the current peak magnitude) is less than the B-latch output signal 524 (the sample peak magnitude), then the A<B signal 514 is asserted and the control logic circuit 512 latches the B-latch 590 with the sample peak magnitude to serve as a new current peak magnitude for the immediately following pulse position window. Thus, the B-latch output signal 524 comprises the current peak magnitude signal for the immediately following pulse position window. At the same time, the control logic circuit 512 makes the A-latch 585 transparent such that the A-latch output signal 534 follows the sample peak magnitude signal 542 during the immediately following pulse position window 210. The control logic circuit 512 also stores the sample peak magnitude in the peak magnitude register 552 and updates its internal register with the bit sequence 220 corresponding to the pulse position window (i.e, the second pulse position window) which produced the new current peak magnitude. The control logic circuit 512 also internally stores the Signbit_B signal 509 indicating which correlator output signal 505 or 510 produced the new current peak magnitude, and also updates an internal register with a bit sequence corresponding to the pulse position window during which the new current peak magnitude was produced (i.e., the second pulse position window).

On the other hand, if the contents of the A-latch 585 (contents of the peak magnitude register 552) are greater than or equal to the magnitude of the sample peak magnitude signal 542, then A-latch 585 remains latched with the current peak magnitude during the immediately following pulse position window 210 while B-latch 590 remains transparent and tracks the sample peak magnitude signal 542. Also, the contents of the peak magnitude register 552 and the bit sequence 220 stored internally in the control logic circuit remain unchanged. Thus, the A-latch output signal 534 comprises the current peak magnitude signal for the immediately following pulse position window 210.

The effect of the above operations is that during each subsequent pulse position window 210 until the end of the timing window 205, whichever of latches 585 and 590 contains the current peak magnitude is latched to provide a current peak magnitude signal while the other latch is made transparent so as to follow the sample peak magnitude signal 542. At the end of each pulse position window 210 the current peak magnitude signal and the sample peak magnitude signal are compared and whichever has a greater magnitude is stored in the peak magnitude register 552 and becomes the new current peak magnitude for the immediately following pulse position window. At the same time, the control logic circuit 512 updates its internal register with the bit sequence 220 corresponding to the pulse position window 210 which produced the new current peak magnitude. The control logic circuit 512 also stores the signbit signal indicating the data bit corresponding to the correlator tap signal 505 or 510 which produced the current peak magnitude.

At the end of the timing window 205, the peak magnitude register 552 contains the greatest peak magnitude detected during the timing window. Also, the control logic circuit contains the bit sequence 220 corresponding to the pulse position window 210 wherein the greatest peak magnitude was detected, and a correlator data bit corresponding to the correlator tap signal which produced the greatest peak magnitude during the timing window. In a preferred embodiment, the correlator data bit is a "1" in response to the correlator tap signal 505 producing the greatest peak magnitude, and the correlator data bit is a "0" in response to the correlator tap signal 510 producing the greatest peak magnitude.

The control logic circuit 512 outputs the correlator data bit and the bit sequence corresponding to the pulse position window wherein the greatest peak magnitude was detected as a correlator data bit and PPM data output signal 574. The peak magnitude register 552 outputs a greatest peak magnitude signal 544 which may be used in a receiver incorporating the Best-of-M pulse position modulation detector to perform data qualification and error detection. For example, the peak magnitude signal 544 may be used for "soft" error decision-making in a forward error correction scheme as is well known in the art.

Although the embodiments of FIG. 3 and FIG. 5 are described with respect to a system wherein PPM is combined with spread spectrum modulation or other coding techniques which increase the number of bits transmitted during a timing window 205, it is possible to provide additional peak detectors for receiving signals from additional correlators and thus to further increase the data throughput of the communication system. Alternatively, in a system incorporating PPM without other modulation techniques, a single peak detector 315 could be used.

By increasing the number in pulse position windows 210 within a timing window 205, the resolution of the system may be increased. In one such embodiment, oversampling may be accomplished by dividing each timing window 205 into M pulse position windows, while only assigning K unique bit sequences, where M>K. For example, a PPM transmitter may modulate three (3) bits per timing window, so that the Best-of-M pulse position modulation detector utilizes eight (8) unique bit sequences (K=8). However M may be selected as some multiple of 8 (e.g., 32) such that each of four (4) pulse position windows 210 corresponds to each of the eight unique bit sequences. In this way, additional information regarding the detected signal may be provided to a receiver for data qualification and error detection and correction. Specifically, an upper limitation on M is placed on the system by the conversion time required by the analog-to-digital converter(s).

Figure 6:
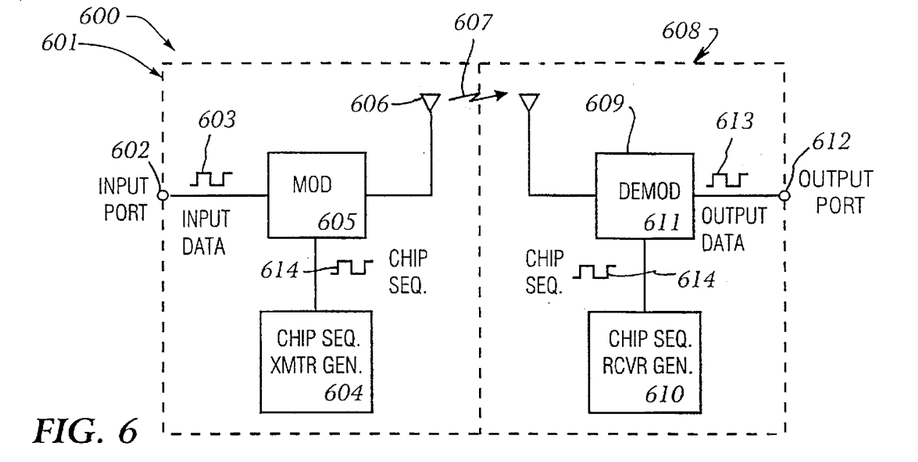
FIG. 6 is a block diagram of a spread spectrum communication transmitter and receiver.

FIG. 6. shows a block diagram of a preferred embodiment of a spread spectrum communication system 600 incorporating a Best-of-M pulse position modulation detector according to one or more aspects of the present invention. The spread spectrum communication system 600 comprises a spread spectrum transmitter 601 and a spread spectrum receiver 608.

In the preferred embodiment of FIG. 6, the spread spectrum transmitter 601 comprises an input port 602 for input data 603, a transmitter chip sequence generator 604, a spread spectrum pulse position modulator 605, and a transmitting antenna 606 for transmitting a pulse position modulated (PPM) spread spectrum signal 607. The spread spectrum receiver 608 comprises a receiver antenna 609, a receiver chip sequence generator 610, a spread spectrum pulse position demodulator 611, and an output port 612 for output data 613.

The transmitter chip sequence generator 604 generates a chip spreading sequence 614 and provides it to the spread spectrum pulse position modulator 605. In a preferred embodiment, the chip spreading sequence 614 comprises a pseudo-random binary bit stream. The spread spectrum pulse position modulator 605 also receives an input data sequence 603 and produces the PPM spread spectrum signal 607. The spread spectrum pulse position modulator 605 may also incorporate other modulation techniques such as phase shift keying (PSK), frequency shift keying (FSK) or quadrature amplitude modulation (QAM).

In the spread spectrum receiver 608, the PPM spread spectrum signal 607 is provided to the spread spectrum pulse position demodulator 611. The spread spectrum pulse position demodulator 611 also receives the chip spreading sequence 614 used by the transmitter 601 for despreading the PPM spread spectrum signal 607. The spread spectrum pulse position demodulator 611 may despread the PPM spread spectrum signal by correlation with the chip spreading sequence 614. The demodulator 611 also may incorporate a PPM detector according to one or more aspects of the present invention. In a preferred embodiment, the spread spectrum pulse position demodulator 611 incorporates a PPM detector 300 or 500.

Figure 7:
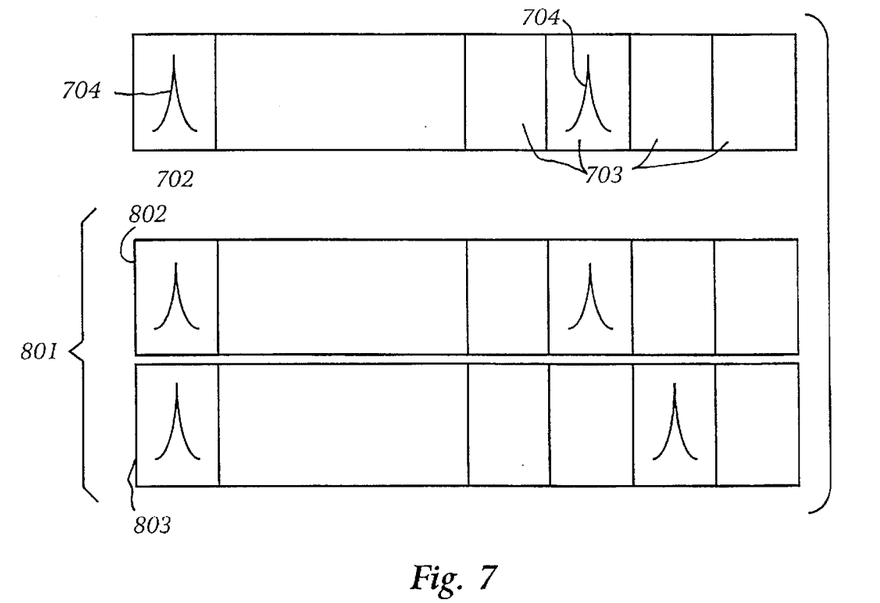
FIG. 7 is a timing diagram for pulse position modulation in a spread spectrum communication system.

FIG. 7 shows a timing diagram for a spread spectrum communication system which incorporates pulse position modulation.

After spread spectrum communication is established, the transmitter 601 and the receiver 608 may agree upon a timing window 701 for pulse position modulation of data. The timing window 701 preferably comprises a framing pulse window 702 at or near the beginning of the timing window 701, and at least one pulse position window 703 following the framing pulse window 702. In a preferred embodiment, the framing pulse window 702 may comprise the time slot located at the start of the timing window 701 and continuing for a predetermined period, e.g., 651 nanoseconds thereafter. In a preferred embodiment, there are eight pulse position windows 703, each lasting 651 nanoseconds and each located with respect to the start of the timing window according to the following equation $T_{PPM(i)} = 5.208 + 6.51 \cdot i$ nsec.

In a particular pulse position modulation format, the transmitter 601 transmits a framing pulse 704 during the framing pulse window 702. Because the framing pulse window 702 occurs at a known time, the receiver 608 may reject as false all pulses which it detects outside the framing pulse window 702. Alternatively, it may treat such pulses as indicating lack of synchronization. After receiving the framing pulse 704, the receiver 608 looks for a data pulse 705 during one of the pulse position windows 703. Because the data pulse 705 must occur at one of a set of known times, the receiver 608 may reject as false all pulses which it detects outside the pulse position windows 703.

In a preferred embodiment, the receiver 608 determines during which of the pulse position windows 703 the data pulse 705 was received. When there are four pulse position windows 703, there are four possibilities, and the choice of one of those four possibilities by the transmitter 601 gives two bits of information to the receiver 608. If the receiver 608 does not detect the data pulse 705 during any of the pulse position windows 703, it may reject the transmission as indicating an error.

In an alternative embodiment, the receiver 608 may recognize its not receiving the data pulse 705 during any of the pulse position windows 703 as an additional choice available to the transmitter 601. For example, if there is just one pulse position window 703, the presence or absence of the data pulse 705 during the pulse position window 703 would involve a choice of one of those two possibilities, and thus give the receiver 608 one bit of information. If there are three pulse position windows 703, the choice of one of those three possibilities, plus the fourth possibility of not transmitting the data pulse 705 at all, would give the receiver 608 two bits of information.

In a second alternative embodiment, the framing pulse 704 may be omitted. In such an embodiment, the receiver 608 may synchronize its operation with that of the transmitter 601, so the receiver 608 may determine the start of the framing pulse window 702 substantially simultaneously (after allowing for transmission delays) with the transmitter 601, and so the receiver 608 may determine the timing of the pulse position windows 703 substantially simultaneously (after allowing for transmission delays) with the transmitter 601.

In a preferred embodiment, the entire chip sequence 614 of may be used to generate a correlation pulse. The chip sequence 614 may comprise 64 chips and the correlation pulse may be adjusted in duration in increments of eight chips. At a transmission rate of about 192 kHz, it takes about 5,208 microseconds to transmit the entire chip sequence of 64 chips, so the offset between the beginning of the framing pulse window 702 and the beginning of the first pulse position window 703 is therefore 5.208 microseconds. However, if the chip sequence 614 is not started immediately after the framing pulse 702 is generated, the start time may be offset by only a small amount. The offset between the successive pulse position windows 703 is therefore only 651 nanoseconds.

Figure 8:
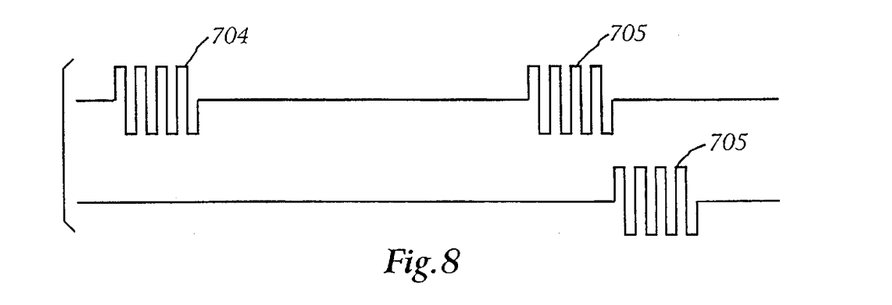
FIG. 8 is a timing diagram for pulse position modulation in a spread spectrum communication system which utilizes more than one spreading code.

FIG. 8 shows a timing diagram for pulse position modulation with more than one spread spectrum code.

After a spread spectrum communication link is established, the transmitter 601 and the receiver 608 may agree to use more than one transmission medium for pulse position modulation. In a preferred embodiment, the transmitter 601 and the receiver 608 may agree upon a plurality of particular spread spectrum codes 801 for communication. To reduce false correlations, the plurality of spread spectrum codes 801 may be pairwise relatively orthogonal. Due to the nature of spread spectrum communication, the transmitter 601 could generate signals for each spread spectrum code essentially independently, and the receiver 608 may receive these signals essentially independently, as if they were transmitted and received on separate media.

In a pulse position modulation format employing more than one spread spectrum code 801, the transmitter 601 transmits the framing pulse 704 during the framing pulse window 702 and with a first code 802. It is not necessary to transmit the framing pulse 704 during the framing pulse window 702 with the second code 803, because the receiver 608 may determine the time from only a single framing pulse 704. After receiving the framing pulse 704, the receiver 608 may look for the data pulse 705 during one of the pulse position windows 703 on either the first code 802 or the second code 803. This could be accomplished by multiple correlators operating in parallel, connected to a plurality of peak detectors. (In a preferred embodiment, two spread spectrum codes 801 are used, but this disclosure applies equally well to techniques which use more than two spread spectrum codes 801.)

In a preferred embodiment, the receiver 608 determines during which of the pulse position windows 703, and on which of the spread spectrum codes 801, the data pulse 705 was received. When there are four pulse position windows 703 and two spread spectrum codes 801, there are eight possibilities, and the choice of one of those eight possibilities by the transmitter 601 gives three bits of information to the receiver 608. If the receiver 608 does not detect the data pulse 705 during any of the pulse position windows 703, on any of the spread spectrum codes 801, it may reject the transmission as indicating an error.

In an alternative embodiment, the receiver 608 may recognize its not receiving the data pulse 705 during any of the pulse position windows 703, for any of the spread spectrum codes 801, as an additional choice available to the transmitter 601. The receiver would thus be able to interpret such an event similar to its treatment of failing to receive the data pulse 705 when using only one of the spread spectrum codes 801.

In a second alternative embodiment, the receiver may recognize receiving the data pulse 705 separately for each of the spread spectrum codes 801. Thus, after receiving the framing pulse 704 for the first spread spectrum code 802, the receiver 608 may detect the data pulse 705 during one of the pulse position windows 703 for the first spread spectrum code 802 and during one of the pulse position windows 703 for the second spread spectrum code 803. When there are four pulse position windows 703 and two spread spectrum codes 801, there are sixteen possibilities, and the choice of one of those sixteen possibilities by the transmitter 601 gives four bits of information to the receiver 608.

In a third alternative embodiment, more than one communication path may be used in place of the more than one spread spectrum code 801. For example, transmission noted above to be using the first code 802 may use spread spectrum techniques, while transmission noted above to be using the second code 803 may be replaced with other techniques, e.g., one of the following:

transmission using narrowband techniques;

transmission using spread spectrum techniques using a different set of frequencies;

transmission using spread spectrum techniques using a different set of multiplexed time slots;

transmission using spread spectrum techniques over a different communication path (such as in a packet switched network);

transmission using another communication medium (such as wire, coaxial cable, or microwave transmission); or other transmission techniques which can be distinguished by the receiver 608.

In a preferred embodiment, the chip sequence 614 of the first spread spectrum code 802 may be 64 chips, and the chip sequence of the second code 803 may be the same 64 chips, in reverse order.

While preferred embodiments are disclosed herein, many variations are possible which remain within the concept and scope of the invention. Such variations will become clear to one of ordinary skill in the art after inspection of the specification, drawings and claims herein. The invention therefore is not to be restricted except within the spirit and scope of the appended claims.

What is claimed is:

1. A method of detecting a pulse in a pulse position modulated signal received by a receiving unit, comprising the steps of:

dividing a timing window into a plurality of pulse position windows;

for each of said pulse position windows, detecting a peak magnitude of the pulse position modulated signal received by said receiving unit;

comparing the peak magnitudes for said pulse position windows of the pulse modulated signal received by said receiving unit to identify a greatest peak magnitude and a one of said pulse position windows wherein said greatest peak magnitude was detected; and generating a bit sequence associated with said one pulse position window.

2. The method of claim 1, further comprising the step of storing said greatest peak magnitude in a peak magnitude register.

3. A method for detecting a pulse in a plurality of pulse position modulated signals received by a receiving unit, comprising the steps of:

dividing a timing window into a plurality of pulse position windows;

detecting a peak magnitude for each of said pulse position modulated signals received by said receiving unit for each of said pulse position windows;

comparing the peak magnitudes for said pulse position modulated signals received by said receiving unit for each of said pulse position windows to identify a greatest peak magnitude and a one of said pulse position windows wherein said greatest peak magnitude was detected; and generating a bit sequence associated with said one pulse position window.

4. The method of claim 3, further comprising the step of storing said greatest peak magnitude in a peak magnitude register.

5. The method of claim 3, further comprising the steps of:

identifying one of said pulse position modulated signals which generated said greatest peak magnitude; and generating a data bit associated with said one pulse position modulated signal.

6. The method of claim 3, wherein said step of comparing the peak magnitudes for said pulse position modulated signals for each of said pulse position windows, comprises the steps of:

for each of said pulse position windows, comparing said peak magnitudes of said pulse position modulated signals to identify a composite peak magnitude; and comparing said composite peak magnitudes for said pulse position windows to identify the greatest peak magnitude and the one of said pulse position windows wherein said greatest peak magnitude was detected.

7. An apparatus for detecting pulses communicated with pulse position modulation, said apparatus comprising:

a peak detector connected to a pulse position modulated signal and generating a sample peak magnitude signal during each of a plurality of predefined pulse position windows within a timing window;

a first latch and a second latch each connected to said sample peak magnitude signal, said first latch being transparent and said second latch being latched with a current peak magnitude signal;

a comparator connected to said first latch and said second latch and generating a comparator output signal; and a control logic circuit connected to said comparator output signal and, in response thereto, latching one of said first latch and said second latch with the sample peak magnitude signal if said sample peak magnitude signal is greater than said current peak magnitude signal.

8. The apparatus of claim 7, further comprising a peak magnitude register connected to said sample peak magnitude signal and current peak magnitude signal, said control logic circuit storing said sample peak magnitude signal in said peak magnitude register if said sample peak magnitude signal is greater than said current peak magnitude signal.

9. A pulse position modulation detector comprising:

peak detection means connected to a pulse position modulated signal and generating a sample peak magnitude in each of a plurality of pulse position windows within a timing window;

comparison means comparing said sample peak magnitudes to identify a greatest peak magnitude and a one of said pulse position windows wherein said greatest peak magnitude was detected; and bit generation means for generating a bit sequence associated with said one pulse position window.

10. The pulse position modulation detector of claim 9, further comprising peak magnitude storage means for storing and providing said greatest peak magnitude.

11. The pulse position modulation detector of claim 9, wherein said peak detection means comprises:

a peak detector connected to said pulse position modulated signal and generating a peak magnitude signal in each of a plurality of pulse position windows.

12. The pulse position modulation detector of claim 9, wherein said comparison means comprises:

a first latch being a transparent latch and a second latch being latched with a current peak magnitude signal;

a comparator connected to said first latch and said second latch and generating a comparator output signal; and a control logic circuit connected to said comparator output signal and, in response thereto during each of said pulse position windows, latching one of said first latch and said second latch with the sample peak magnitude signal if said sample peak magnitude signal is greater than said greatest peak magnitude signal.

13. In a system for pulse position modulation communication wherein a timing window is divided into a plurality of pulse position windows, a pulse position modulation detector comprising:

a first peak detector connected to a first pulse position modulated signal and generating therefrom a first peak signal in each of said plurality of pulse position windows;

a second peak detector connected to a second input signal and generating therefrom a second peak signal in each of said plurality of pulse position windows;

peak signal selection means connected to said first peak signal and said second peak signal and selecting in each of the pulse position windows the greater of said first and second peak signals as a sample peak magnitude signal;

a first latch and a second latch each connected to the sample peak magnitude signal, one of said latches being transparent during each pulse position window and the other of said latches being latched with a current peak magnitude signal;

a first comparator connected to said sample peak magnitude signal and said current peak magnitude signal and generating a comparator output signal; and a control logic circuit connected to said comparator output signal and, in response thereto, latching one of said first latch and said second latch with the sample peak magnitude signal if said sample peak magnitude signal is greater than said current peak magnitude signal.

14. The pulse position modulation detector of claim 13, further comprising a peak magnitude register connected to said sample peak magnitude signal and said current peak magnitude signal, said control logic circuit storing said sample peak magnitude signal in said peak magnitude register if said sample peak magnitude signal is greater than said current peak magnitude signal.

15. The pulse position modulation detector of claim 13 wherein said peak signal selection means comprises:

a first analog-to-digital converter connected to said first peak signal and generating a first digitized peak signal;

a second analog-to-digital converter connected to said second peak signal and generating a second digitized peak signal;

a second comparator connected to said first digitized peak signal and said second digitized peak signal, and generating a select signal indicating a one of said first and second digitized peak signals which is greater; and a multiplexer connected to said select signal and selecting said one digitized peak signal as the sample peak magnitude signal.

16. The pulse position modulation detector of claim 13 wherein said peak signal selection means comprises:

an equal-gain diff-amp connected to said first peak signal and said second peak signal and generating a composite peak signal;

an analog-to-digital converter receiving the composite peak signal and generating therefrom a digitized peak signal; and and XOR bank receiving the digitized peak signal and generating therefrom the sample peak magnitude signal.

17. The pulse position modulation detector of claim 13 wherein said peak signal selection means provides a peak selection signal to said control logic circuit identifying a one of said first and second peak signals which is greater, said control logic circuit producing therefrom a correlator data bit signal indicating a one of said first and second input signals which produced said one peak signal.

18. The pulse position modulation detector of claim 13, wherein said pulse position modulation detector is incorporated in a spread spectrum communication system further comprising a spread spectrum transmitter, comprising:

an input port connected to an input data signal;

a transmitter chip sequence generator generating a predetermined chip spreading sequence;

a spread spectrum pulse position modulator connected to said input data signal and said predetermined chip spreading sequence, and generating a spread spectrum pulse position modulated signal;

said spread spectrum communication system further comprising a spread spectrum receiver, comprising:

a receiver chip sequence generator generating said predetermined chip spreading sequence; and a spread spectrum pulse position demodulator connected to said spread spectrum pulse position signal and said predetermined chip spreading sequence and generating a received data signal.

* * * * *

UNITED STATES PATENT AND TRADEMARK OFFICE
CERTIFICATE OF CORRECTION

PATENT NO. : 5,666,379
DATED : September 9, 1997
INVENTOR(S) : David Ovard et al.

It is certified that error appears in the above-identified patent and that said Letters Patent is hereby corrected as shown below:

In column 8, line 6, please delete the number "543".

The title page should be deleted to appear as per attached title page.

Please delete drawing sheet 6-6 and substitute drawing sheets 6-6 as per attached.

Signed and Sealed this

Thirteenth Day of July, 1999

*Attest:*

*Attesting Officer*

Q. TODD DICKINSON

*Acting Commissioner of Patents and Trademarks*

FIG. 6

Fig. 7